(12) United States Patent
Goldman

(10) Patent No.: US 12,138,530 B2
(45) Date of Patent: Nov. 12, 2024

(54) CONTROLLING DATA PROCESSING

(71) Applicant: Sony Interactive Entertainment Inc., Tokyo (JP)

(72) Inventor: Daniel Goldman, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 104 days.

(21) Appl. No.: 17/004,139

(22) Filed: Aug. 27, 2020

(65) Prior Publication Data

US 2021/0060414 A1   Mar. 4, 2021

(30) Foreign Application Priority Data

Aug. 30, 2019   (GB) ..................................... 1912492

(51) Int. Cl.
*A63F 13/218*      (2014.01)
*A63F 13/24*       (2014.01)
*G06F 3/041*       (2006.01)

(52) U.S. Cl.
CPC ............ *A63F 13/218* (2014.09); *A63F 13/24* (2014.09); *G06F 3/041* (2013.01); *G06F 2203/04105* (2013.01)

(58) Field of Classification Search
CPC ................................ A63F 13/218; A63F 13/24
See application file for complete search history.

(56) References Cited

U.S. PATENT DOCUMENTS

| | | | |
|---|---|---|---|
| 5,076,584 A * | 12/1991 | Openiano ............. | A63F 13/218 463/36 |
| 5,579,238 A | 11/1996 | Krugman | |
| 5,745,376 A | 4/1998 | Baker | |
| 6,400,285 B1 | 6/2002 | Gifford | |
| 6,717,568 B1 * | 4/2004 | Takatuka .............. | G06F 3/0216 345/156 |
| 8,274,484 B2 * | 9/2012 | Baudisch .............. | G06F 1/1626 345/173 |
| 9,984,549 B2 * | 5/2018 | Poisner ................... | A63F 13/46 |
| 10,410,425 B1 * | 9/2019 | Patel ..................... | A63F 13/218 |
| 10,649,583 B1 * | 5/2020 | Leinbaugh .............. | G06F 3/044 |
| 10,900,780 B2 * | 1/2021 | Seo ......................... | G01C 25/00 |
| 2003/0107547 A1 * | 6/2003 | Kehlstadt ............ | G06F 3/03543 345/156 |
| 2004/0119700 A1 | 6/2004 | Ichikawa | |
| 2007/0132733 A1 * | 6/2007 | Ram .................... | G06F 3/03544 345/163 |

(Continued)

FOREIGN PATENT DOCUMENTS

| | | |
|---|---|---|
| EP | 0768598 A1 | 4/1997 |
| JP | 2003154169 A | 5/2003 |

OTHER PUBLICATIONS

Combined Search and Examination Report for corresponding GB Application No. GB1912492.4, 8 pages, dated Jan. 28, 2020.

*Primary Examiner* — Tramar Harper
(74) *Attorney, Agent, or Firm* — Matthew B. Dernier, Esq.

(57) ABSTRACT

Data processing apparatus comprises a control device having one or more user-operable controls; a pressure detector to detect user pressure applied while operating the one or more user-operable controls; and a processor to initiate a data processing action in response to a detection of user pressure of at least a threshold amount greater than that required to operate the one or more user controls.

8 Claims, 6 Drawing Sheets

(56) References Cited

U.S. PATENT DOCUMENTS

| | | | | |
|---|---|---|---|---|
| 2007/0257821 | A1* | 11/2007 | Son | G06F 3/0446 341/22 |
| 2010/0009761 | A1* | 1/2010 | Ohta | G01C 19/065 463/43 |
| 2010/0127983 | A1* | 5/2010 | Irani | G06F 3/03543 345/163 |
| 2011/0050576 | A1* | 3/2011 | Forutanpour | G06F 3/0488 345/168 |
| 2011/0242361 | A1* | 10/2011 | Kuwahara | G06F 1/1656 348/231.4 |
| 2011/0263328 | A1* | 10/2011 | Yamashita | A63F 13/24 463/36 |
| 2012/0258800 | A1* | 10/2012 | Mikhailov | A63F 13/285 463/36 |
| 2013/0005469 | A1* | 1/2013 | Selim | A63F 13/2145 463/37 |
| 2013/0029764 | A1* | 1/2013 | Wang | A63F 13/211 463/37 |
| 2013/0324254 | A1* | 12/2013 | Huang | A63F 13/335 463/37 |
| 2014/0349753 | A1* | 11/2014 | Imai | H04L 67/10 463/31 |
| 2015/0049064 | A1* | 2/2015 | Shin | G06F 3/044 345/178 |
| 2016/0067136 | A1* | 3/2016 | Raghavan | A61B 5/225 601/40 |
| 2016/0361641 | A1* | 12/2016 | Koizumi | A63F 13/26 |
| 2018/0028913 | A1* | 2/2018 | Onozawa | A63F 13/23 |
| 2018/0095556 | A1* | 4/2018 | Ho | G06F 3/0338 |
| 2018/0164883 | A1* | 6/2018 | Higgins | A63F 13/218 |
| 2018/0193740 | A1* | 7/2018 | Oizumi | A63F 13/2145 |
| 2018/0264357 | A1* | 9/2018 | Dalton | A63F 13/22 |
| 2018/0342135 | A1* | 11/2018 | Benson | G08B 1/08 |
| 2019/0138107 | A1* | 5/2019 | Nietfeld | G06T 19/006 |
| 2019/0278372 | A1* | 9/2019 | Nakagawa | A63F 13/22 |
| 2020/0384352 | A1* | 12/2020 | Okamura | G06F 3/0416 |
| 2021/0098210 | A1* | 4/2021 | Wu | G01L 1/205 |

* cited by examiner

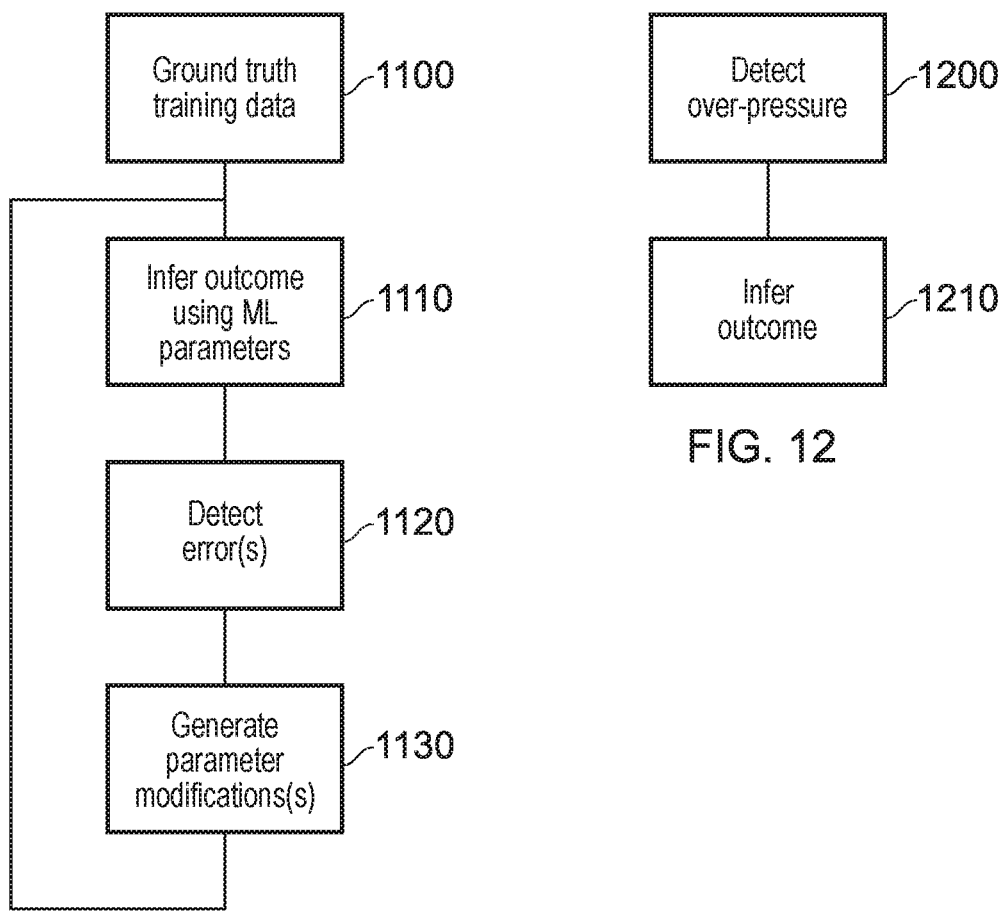

CONTROLLING DATA PROCESSING

BACKGROUND

Field of the Disclosure

This disclosure relates to controlling data processing.

Description of the Prior Art

Some data processing activities may be controlled by a detection of a trackable device, for example.

An example arrangement involves a games machine, in which a games machine is connected to a device such as a head mountable display (HMD) or a display monitor and operates in response to one or more hand-holdable controllers such as a Sony® Move® Controller, a Sony® Dual Shock® controller or the like.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

Various aspects and features of the present disclosure are defined in the appended claims and within the text of the accompanying description and include a data processing apparatus, a method, a control device and a computer program.

Example embodiments of the present disclosure provide data processing apparatus comprising:
- a control device having one or more user-operable controls;
- a pressure detector to detect user pressure applied while operating the one or more user-operable controls; and
- a processor to initiate a data processing action in response to a detection of user pressure of at least a threshold amount greater than that required to operate the one or more user controls.

Example embodiments of the present disclosure also provide a control device comprising:
- one or more user-operable controls;
- a pressure detector to detect user pressure applied while operating the one or more user-operable controls; and
- a processor to initiate a data processing action in response to a detection of user pressure of at least a threshold amount greater than that required to operate the one or more user controls.

Example embodiments of the present disclosure also provide a method comprising:
- a pressure detector to detect user pressure applied while operating one or more user-operable controls of a control device; and
- initiating a data processing action in response to a detection of user pressure of at least a threshold amount greater than that required to operate the one or more user controls.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 11 and 12 are schematic flowcharts illustrating respective methods relating to machine learning techniques;

DESCRIPTION OF THE EMBODIMENTS

Figure 1:
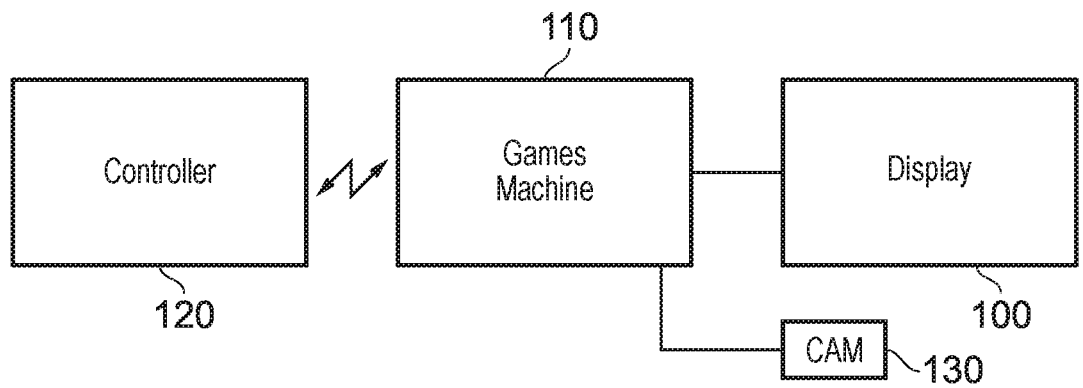
FIG. 1 schematically illustrates use of a games machine or console.

Referring to the drawings, FIG. 1 schematically illustrates a system comprising a display 100 such as a head-mountable display (HMD) and/or a monitor connected to a games machine 110 such as a Sony® PlayStation® games console 300 as an example of a base device.

FIG. 1 also illustrates a hand-held controller 120 which may be, for example, a Sony® Move® controller or a Sony® DualShock® controller or a Sony® Sixaxis® controller which communicates wirelessly with the games console 110 to control (or to contribute to the control of) operations relating to a currently executed program at the games console.

A camera 130 is associated with the console or games machine 110 to capture images of the user and/or the controller 120.

Figure 2:
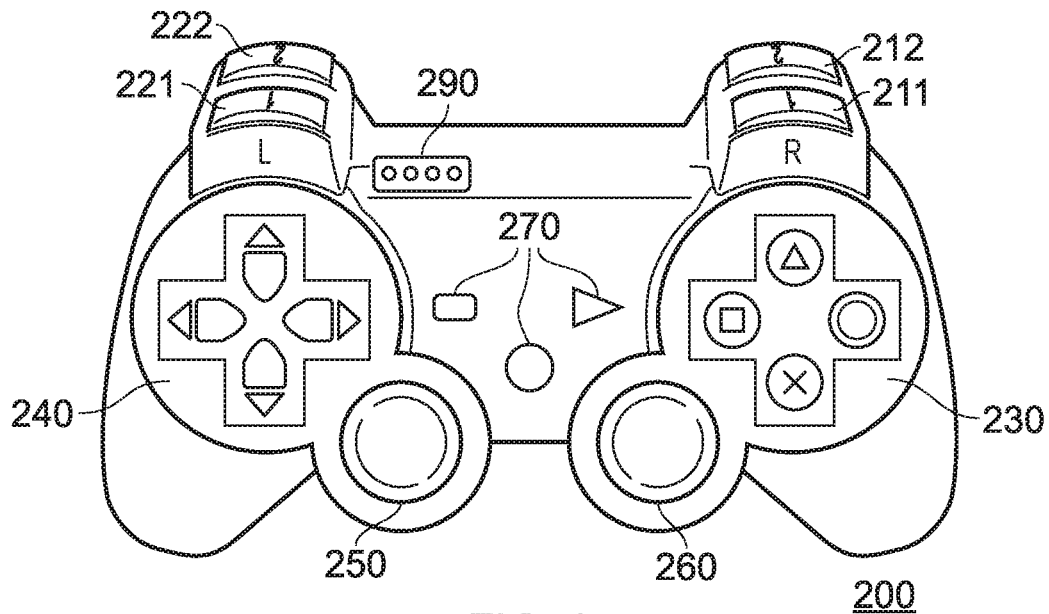
FIGS. 2 and 3 schematically illustrate example controller devices.
Figure 3:
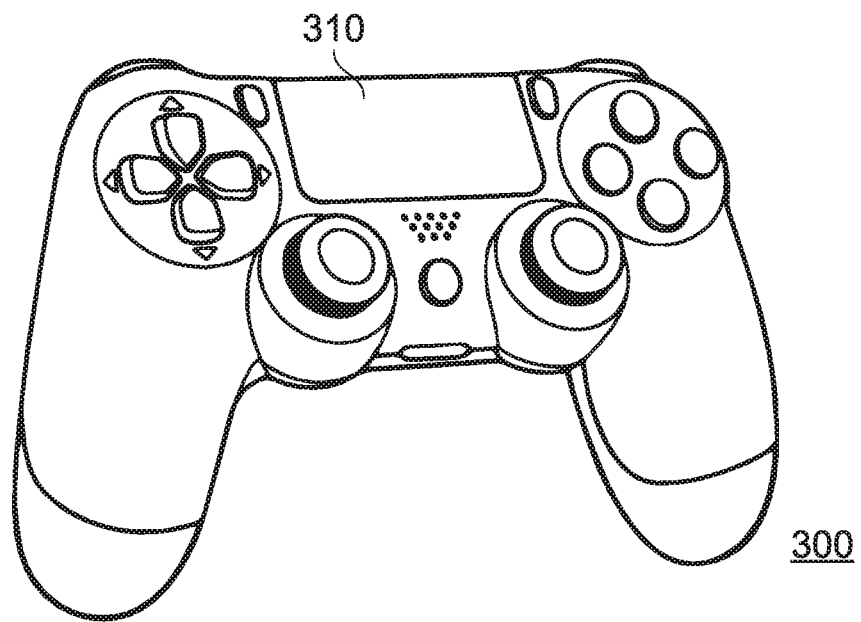

Examples of the controller 120 are shown schematically in FIGS. 2 and 3. FIG. 2 schematically illustrates, as an example of a hand-held controller 120, a PlayStation 3 game controller 200, known as the SIXAXIS® controller, which comprises two joysticks 250, 260, two sets of four pressbuttons 230, 240, and two pairs of pressure sensitive trigger buttons, 211, 212, 221, 222. In addition the central portion of the controller contains three 'system' buttons 270 that typically access functions of the operating system or current application and a set 290 of LED indicators.

In addition, the controller 200 contains a MEMs (microelectro-mechanical systems) motion detection mechanism (not shown), comprising accelerometers (not shown) that detect the extent of translational movement along three axes, and gyroscopes (also not shown) that detect the extent of rotational movement about these axes.

Another example controller 300 (FIG. 3) schematically represents a so-called DualShock® controller which shares many similar functions and user interfaces with the controller 200 but also provides a touch pad 310 and a haptic feedback arrangement (not shown) to provide vibrational or other feedback to the user holding the controller 300.

Another example type of controller (not shown) is a so-called Sony® Move® controller which comprises a handle portion and an illuminated end portion. The handle portion 100 can carry one or more control buttons and/or joysticks and houses an inertial measurement unit (IMU).

Figure 4:
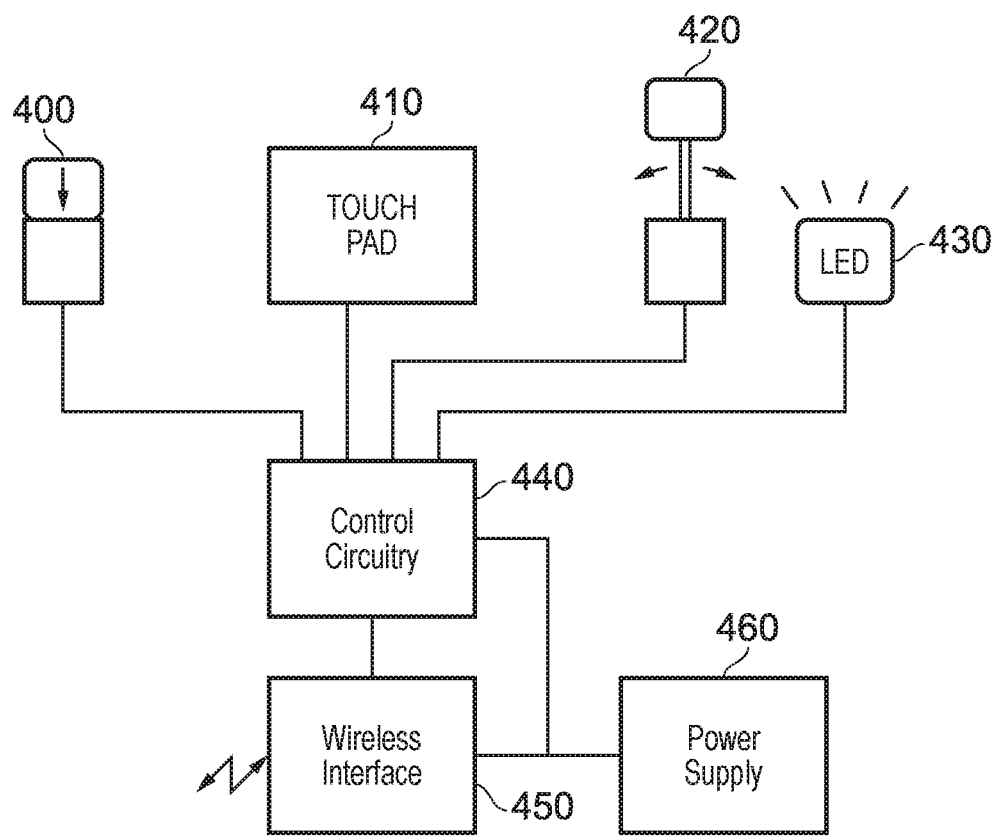
FIG. 4 schematically illustrates a controller device.

Referring to FIG. 4, some aspects of the structure of one of the controllers 200, 300 are shown. In FIG. 4, haptic feedback arrangements and motion sensing arrangements are not shown, because these particular features are not relevant to the techniques to be discussed below.

In FIG. 4, an example control button 400, touch pad 410, joystick 420 and LED indicator 340 are shown, all of which are connected to control circuitry 440 which in turn communicates with a wireless interface 450 representing an example of wireless communications circuitry to communicate with the processor (440 or 110).

A power supply 460 supplies power to the various circuit components.

In use, the user operates one or more buttons, touchpads, joysticks, from which operations the control circuitry 440 generates control signals to be sent by the wireless interface to the games machine or apparatus 110. The games machine 110 performs a data processing action, such as progressing a particular aspect of computer gameplay, in response to the information received from the controller 120. As well as generating information for display by the display arrangement 100, the games machine can also communicate back to the controller, via the wireless interface 150 and the control circuitry 450, information to be communicated to the user, such as lighting up one or more LEDs 430 or operating the haptic feedback arrangement if present (not shown).

Processing functions associated with parsing and interpreting the user operations of the controls 400, 410, 420 may be carried out by the control circuitry 440 and/or by a processor at the games machine 110. The question of where the processing is carried out is a routine design choice for the system designer. Carrying out more processing of the control information at the controller itself (for example using the control circuitry 440) can help to reduce wireless data usage by the wireless interface 450 because raw data does not need to be sent. However, the computer processors associated with the games machine 110 are generally much more powerful than processors which can be housed in a hand-held controller, and also the power supply arrangements available to the games machine 110 are generally significantly greater than those provided by the power supply 460 (for example a rechargeable battery). So this would suggest carrying out more processing activity at the games machine 110. But as discussed above, the choice of where to do this processing is a design choice for the system designer.

Each of the types of controls found in FIG. 4, namely buttons 400, touch pad 410, joystick 420 may be made pressure-sensitive. Example techniques will be discussed in relation to buttons but similar techniques can be applied to any types of controls.

Figure 5A:
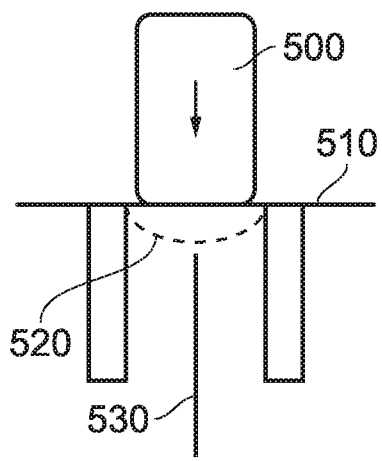
FIGS. 5a-5c and 6a-6b schematically illustrate control buttons.

FIG. 5a schematically represents a control button for use in the controller 110, comprising a finger-pressable formation 500 (the "button" part which is touched by the user) which is configured to deform a conductive sheet 510 from a rest position as shown in bold line in FIG. 5a to a deformed position 520 shown in broken line. Deforming the conductive sheet 510 closes a circuit between an electrode 530 and the conductive sheet 510, so that this can be detected as a button press by suitable electronics.

Figure 5B:
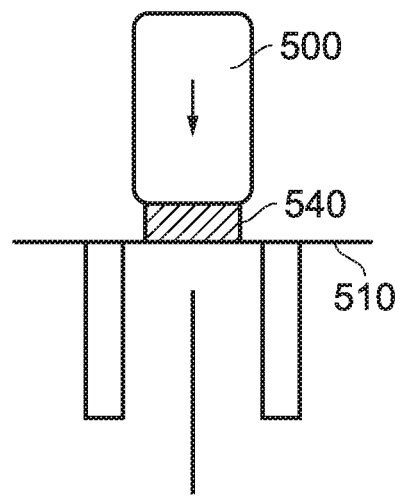
Figure 5C:
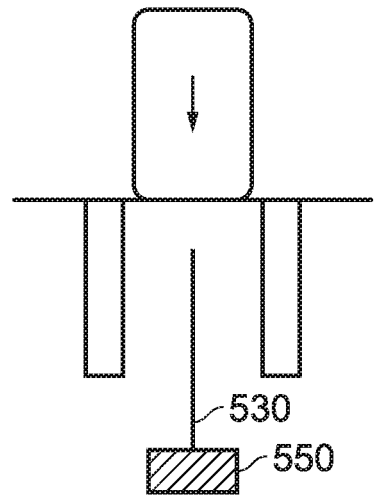
Figure 7:
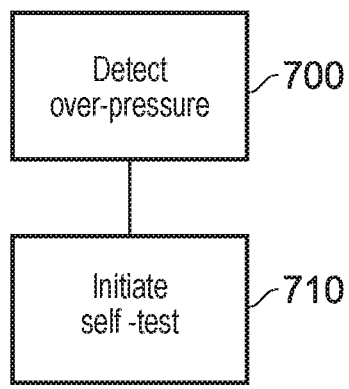
FIGS. 7 to 10 are schematic flowcharts illustrating respective methods.

Referring to FIG. 5b, a pressure detector 540 can be positioned between the formation 500 and the sheet 510, or in FIG. 5c, a pressure detector 550 can be mounted with respects to the electrode 530 so as to detect downwards (as drawn) pressure on the electrode 530.

The pressure detector 540, 550 may be, for example, a piezo-electric detector, a detector formed of a block or sheet of metal-loaded or carbon-loaded conductive foam having a resistance which varies according to compressive forces applied to the foam, or the like. An electrical signal indicative of the amount of user pressure can be provided to the controller 440 by the detector 540, 550.

Figure 6A:
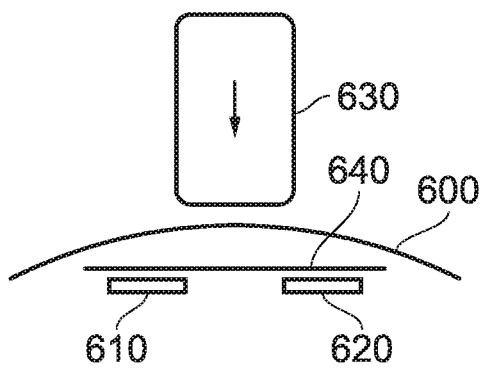
Figure 6B:
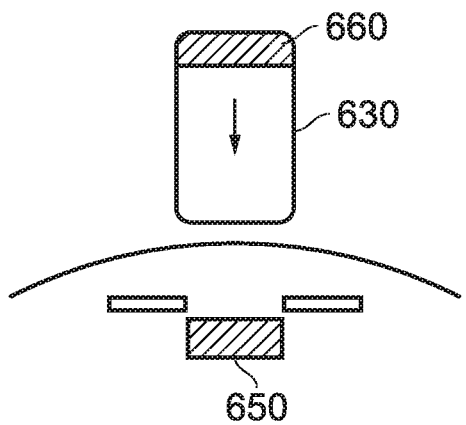

FIG. 6a schematically illustrates another type of control button in which a metal-loaded or carbon-loaded flexible plastics cap 600 may be pressed down onto a pair of electrodes 610, 620 by user pressure on a button portion 630 and in doing so it completes a circuit between the electrodes 610, 620. The position 600 is a rest position of the deformable cap and a position 5640 pressed down upon the electrode 610, 620 is a deformed position when the button is pressed. Here, user pressure can in fact be detected by a change in the resistance between the electrodes 610, 620. The resistance goes from infinite (when the button is not pressed) to a finite value as the button is pressed so as to apply the conductive cap 600 onto the electrode 610, 620, but may then continue to drop as the button is pressed even harder. So, the basic switch arrangement of FIG. 6a can provide a pressure indication. In FIG. 6b, a discreet pressure detector 650 is provided so as to detect the application of force by the user pressing the button portion 630.

Note that in other examples, instead of (or in addition to) the sensor 650, a sensor portion 660 can be included as part of the button structure. A generally equivalent example is applicable in FIG. 5b, where the sensor effectively forms a lower (as drawn) part of the button structure.

Equivalent arrangements can be applied to the other types of user control discussed above. In the context of a control device comprising one or more user-operable controls (such as buttons, joysticks, touch pad controls), this provides various examples of a pressure detector 540, 550, 650, 660 to detect user pressure applied while operating the one or more user-operable controls; and a processor 440 (though some or all of this functionality may be provided by 110) to initiate a data processing action in response to a detection of user pressure of at least a threshold amount greater than that required to operate the one or more user controls.

So, each of these arrangements can provide a pressure-related signal to the control circuitry 440. In these examples, one or more of the user-operable controls comprise a respective pressure sensor.

FIGS. 7-10 schematically illustrate possible outcomes relating to the detection of the pressure-related signal and in particular with respect to the detection of an over-pressure situation where the user is deemed to be pressing "too hard" on one or more of the control buttons. The definition of "too hard" is one which can be predetermined or can be derived by the controller and/or the games machine, for example, a predetermined upper limit of acceptable user pressure (consistent with long-term usability of the controller 110) may be established, but as a secondary threshold, a level of user pressure which is (say) 50% greater than the user's normal level of pressure needed to operate the controls may be applied as a threshold. Therefore, in examples, the test applied to detect an over-pressure situation can be, for example, a detection of user pressure of at least a threshold amount (as a pressure difference or a proportion) greater than that required to operate the one or more user controls.

Example responses (data processing actions, for example by the games machine 110) will now be described with reference to FIG. 7-10, for example involving one or more actions selected from the list consisting of:

notifying the user;
notifying one or more other users;
initiating a testing procedure of at least the control device; and
storing data indicative of a current data processing state of the apparatus at the time of the detection.

Each of the schematic flowcharts of FIG. 7-10 starts with a step 700, 800, 900, 1000 of detecting such an over-pressure situation. Various options are available to handle such a detection. For example, in FIG. 7, at a step 710, the system assumes that there is a potential fault which is causing the controller to be temporarily relatively unresponsive, and so a self-test process is initiated by the games machine and/or the control circuitry 440.

Figure 8:
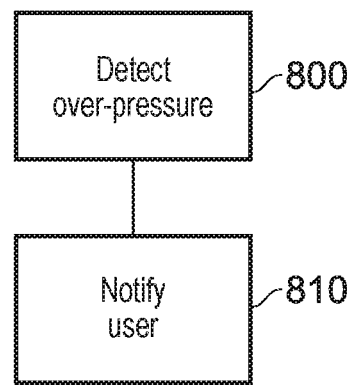

In FIG. 8, the user is sent a notification at a step 810 to inform the user (visually, audibly by haptic feedback or the like) the user is at risk of damaging the controller 110.

Figure 9:
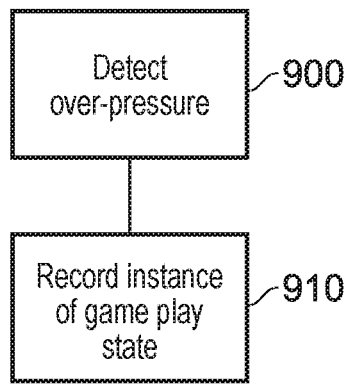

In FIG. 9, an assumption may be made that the reason the user is pressing the controller harder than usual is because of user excitement, thereby indicating a particularly thrilling or engaging section of gameplay, so in response the system (for example the games machine 100) records at a step 910 an instance of the gameplay state at that time.

Figure 10:
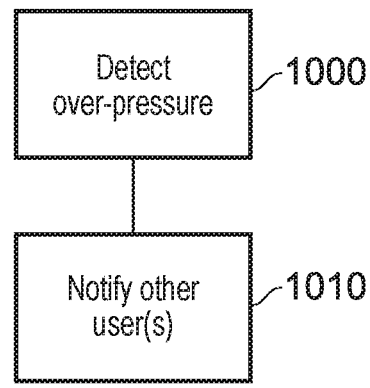

In FIG. 10, at a step 1010, other user(s) may be notified of the instance of over-pressure, again using the over-pressure as a proxy for the recognition of a particularly engaging piece of gameplay, so that other users or even commentators may wish to know about it.

The processor 440 and/or the processing function (in this context) of the games machine 110 may be performed by, for example, a trained machine-learning processor. FIG. 11 schematically illustrates a training process for such a processor and FIG. 12 schematically illustrates an inference process in operational use of such a processor.

Referring to FIG. 11, the training process is performed with respect to so-called ground truth training data 1100. This can include ground truth input data such as pressure data from user application of the control(s), game state data, microphone (audio) data providing an indication of the user's state of agitation or the like. The ground truth output data is an indication (obtained by observing or questioning the user or by having created artificially situations in which the controls became relatively unresponsive by virtue of a software or a real or simulated hardware fault) as to the cause of the over-pressure and therefore the appropriate outcome of those shown in FIGS. 7-10. This may comprise a significant number (perhaps, many thousands) of data acquisitions, some indicating game excitement, some indicating faulty controls or software and the like.

During the training phase, an outcome (FIGS. 7-10) is inferred using machine learning parameters such as machine learning weights. At a step 1120, an error function between the outcomes associated with the ground truth training data 1100 and the inferred outcomes at the step 1110 is detected, and at a step 1130, modifications to the parameters such as machine learning weights are generated and applied for the next iteration of the steps 1110, 1120, 1130. Each iteration can be carried out using different instances of the ground truth training data 1100, for example.

In an inference phase of the trained machine-learning processor (FIG. 12), over-pressure data (and optionally other data such as game state data, audio (microphone) data or the like is detected at a step 1200, and then, at a step 1210, an outcome (FIGS. 7-10) is inferred using the trained machine learning parameters generated as described above.

Figure 13:
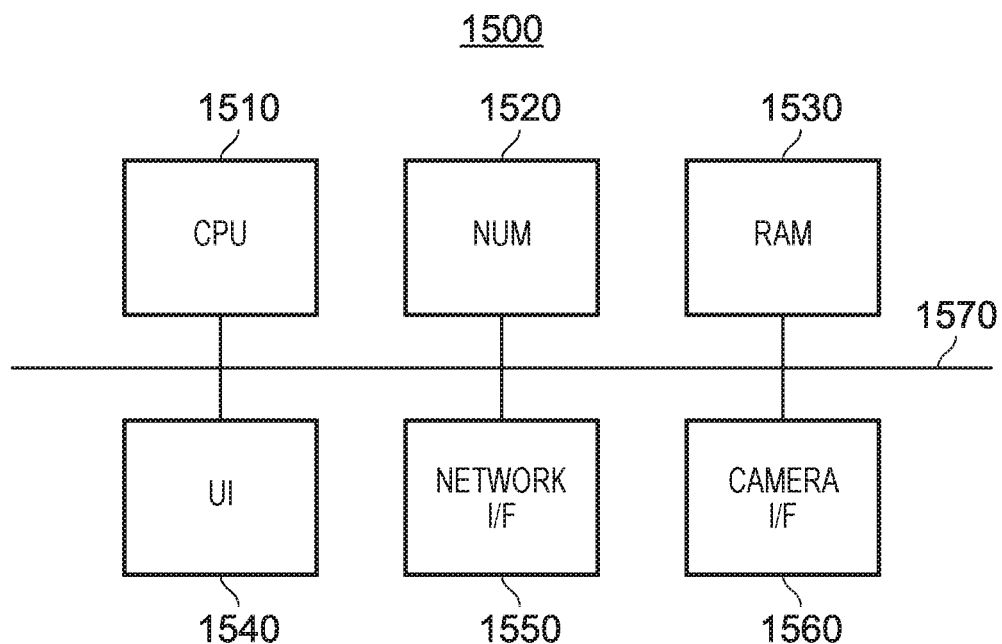
FIG. 13 schematically illustrates a data processing device or apparatus.

FIG. 13 schematically illustrates a data processing apparatus or device such as the games console 300. The apparatus 1500 comprises one or more processing elements such as a central processing unit 1510 (CPU), a non-volatile memory 1520 such as a read only memory (ROM), a flash memory, a magnetic or optical disk or the like, a random access memory (RAM) 1530, a user interface 1540, a network interface 1550 to provide connectivity with different apparatus in the system, and (at least for the control apparatuses) a camera interface 1560. All of these elements are interconnected by a bus structure 1570. In operation, program code is stored in the non-volatile memory 1520 and transferred to the random access memory 1530 for execution i.e. CPU 1510 to perform the functionality discussed above.

Figure 14:
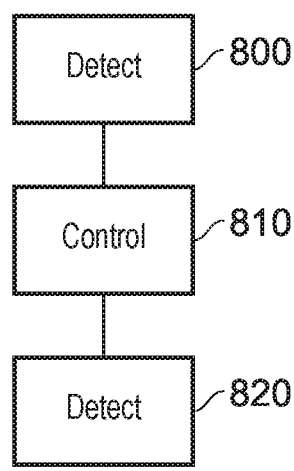
FIG. 14 is a schematic flowchart illustrating a method.

FIG. 14 is a schematic flowchart illustrating a method comprising:

detecting (at a step 1400) user pressure applied while operating one or more user-operable controls of a control device; and initiating (at a step 1410) a data processing action in response to a detection of user pressure of at least a threshold amount greater than that required to operate the one or more user controls.

It will be appreciated that in example embodiments the techniques discussed above, including the method of FIG. 14, can be implemented by computer software operating on a general purpose computing system such as one or more games machines which may have the form of the apparatus of FIG. 13. In these examples, computer software, which when executed by a computer, causes the computer to carry out any of the methods discussed above is considered as an embodiment of the present disclosure. Similarly, embodiments of the disclosure are provided by a non-transitory, machine-readable storage medium (such as the medium 1520) which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. Data processing apparatus comprising:
  a control device having one or more user-operable controls;
  a pressure detector to detect user pressure applied while operating the one or more user-operable controls; and
  a processor to initiate a data processing action in response to a detection of user pressure of at least a threshold amount greater than that required to operate the one or more user controls, wherein the data processing action comprises initiating a testing procedure of at least the control device to detect whether there is a fault causing the control device to become temporarily unresponsive, where the data processing apparatus is a computer game apparatus.

2. The data processing apparatus according to claim 1, in which one or more of the user-operable controls comprise a respective pressure sensor.

3. The data processing apparatus according to claim 1, in which the data processing action comprises one or more of:
  notifying the user; and
  notifying one or more other users.

4. The data processing apparatus according to claim 1, in which:
  the control device comprises wireless communications circuitry to communicate with the processor.

5. The data processing apparatus according to claim 1, in which the one or more user operable controls comprise one or more of: buttons; joysticks; and touch pad controls.

6. The data processing apparatus according to claim 1, in which the processor comprises a trained machine-learning processor.

7. A method comprising:
  detecting user pressure applied while operating one or more user-operable controls of a control device for a data processing apparatus; and initiating a data processing action in response to a detection of user pressure of at least a threshold amount greater than that required to operate the one or more user controls, wherein the data processing action comprises initiating a testing procedure of at least the control device to detect whether there is a fault causing the control device to become temporarily unresponsive, where the data processing apparatus is a computer game apparatus.

8. A non-transitory machine-readable storage medium which stores computer software which, when executed by a computer, causes the computer to perform a method comprising:

detecting user pressure applied while operating one or more user-operable controls of a control device for a data processing apparatus; and initiating a data processing action in response to a detection of user pressure of at least a threshold amount greater than that required to operate the one or more user controls, wherein the data processing action comprises initiating a testing procedure of at least the control device to detect whether there is a fault causing the control device to become temporarily unresponsive, where the data processing apparatus is a computer game apparatus.

* * * * *